US011198386B2

(12) United States Patent
Mulligan (10) Patent No.: US 11,198,386 B2
(45) Date of Patent: Dec. 14, 2021

(54) SYSTEM AND METHOD FOR CONTROLLING OPERATION OF HEADLIGHTS IN A HOST VEHICLE (71) Applicant: LEAR CORPORATION, Southfield, MI (US)

(72) Inventor: David R. Mulligan, Livonia, MI (US)

(73) Assignee: LEAR CORPORATION, Southfield, MI (US)

(*) Notice: Subject to any disclaimer, the term of this patent is extended or adjusted under 35 U.S.C. 154(b) by 78 days.

(21) Appl. No.: 16/504,913

(22) Filed: Jul. 8, 2019

(65) Prior Publication Data

US 2021/0009027 A1    Jan. 14, 2021

(51) Int. Cl.
*B60Q 1/06* (2006.01)
*B60Q 1/14* (2006.01)
*G08G 1/01* (2006.01)
*B60Q 9/00* (2006.01)

(52) U.S. Cl.
CPC ............ *B60Q 1/06* (2013.01); *B60Q 1/14* (2013.01); *B60Q 9/00* (2013.01); *G08G 1/012* (2013.01); *G08G 1/0125* (2013.01)

(58) Field of Classification Search
CPC ... B60Q 9/00; B60Q 1/06; B60Q 1/14; G08G 1/012; G08G 1/0125
USPC ........................................................ 701/36
See application file for complete search history.

(56) References Cited

U.S. PATENT DOCUMENTS

| 3,500,119 A | 1/1967 | Price |
| 4,236,099 A | 11/1980 | Rosenblum |
| 4,967,319 A | 10/1990 | Seko |
| 5,451,820 A | 9/1995 | Gotoh et al. |

(Continued)

FOREIGN PATENT DOCUMENTS

| CA | 2568055 A1 | * 3/2000 | ......... G06K 9/00825 |
| CN | 108839610 A | * 11/2018 | |

(Continued)

OTHER PUBLICATIONS

ECall—Wikipedia_.pdf, Jun. 1, 2018, https://en.wikipedia.org/wiki/ECall (The Wayback Machine—https://en.wikipedia.org/wiki/ECall), 4 pages.

(Continued)

*Primary Examiner* — Atul Trivedi
(74) *Attorney, Agent, or Firm* — Brooks Kushman P.C.

(57) ABSTRACT

A system and method are described for controlling operation of host vehicle headlights. The system includes a communication unit to receive a vehicle-to-x communication including data indicative of a characteristic of a second vehicle. The system also includes a controller to determine that a high-beam is generated by the host vehicle headlights, determine a state of the second vehicle based on the second vehicle characteristic data, determine a state of the host vehicle based on data indicative of a characteristic of the host vehicle, determine that a pre-defined condition exists involving the host vehicle and second vehicle based on the second vehicle state and the host vehicle state, and, in response to the determination that the high-beam is generated and the pre-defined condition exists, generate a headlight control signal that effectuates an automatic change of the host vehicle headlights from a high-beam to a low-beam operating state.

20 Claims, 5 Drawing Sheets

(56) References Cited

U.S. PATENT DOCUMENTS

| | | |
|---|---|---|
| 5,942,853 A | 8/1999 | Piscart |
| 6,010,277 A | 1/2000 | Follman |
| 6,097,023 A | 8/2000 | Schofield et al. |
| 6,587,573 B1 | 7/2003 | Stam et al. |
| 6,877,929 B1 | 4/2005 | Vang |
| 7,507,052 B2 | 3/2009 | Griffiths |
| 7,565,006 B2 | 7/2009 | Stam et al. |
| 7,566,851 B2 | 7/2009 | Stein et al. |
| 7,609,150 B2 | 10/2009 | Wheatley et al. |
| 7,645,090 B2 | 1/2010 | Rastegar et al. |
| 8,186,905 B2 | 5/2012 | Castro et al. |
| 8,688,376 B2 | 4/2014 | Stahlin et al. |
| 8,946,990 B1 * | 2/2015 | Gupta .................. G08G 1/166 315/82 |
| 8,970,358 B2 * | 3/2015 | Kiefer .................. B60W 50/14 340/436 |
| 9,035,797 B2 | 5/2015 | Varma |
| 9,204,276 B2 | 12/2015 | Hellwig et al. |
| 9,333,971 B1 | 5/2016 | Han |
| 9,443,426 B1 | 9/2016 | Formwait |
| 9,555,736 B2 | 1/2017 | Solar et al. |
| 9,558,659 B1 | 1/2017 | Silver et al. |
| 9,689,121 B2 | 6/2017 | Shi et al. |
| 9,713,956 B2 | 7/2017 | Bark et al. |
| 9,729,636 B2 | 8/2017 | Koravadi et al. |
| 9,731,645 B1 * | 8/2017 | Taleb-Bendiab ........................... G08G 1/096716 |
| 9,809,167 B1 | 11/2017 | Badger, II |
| 9,824,581 B2 | 11/2017 | Bhat et al. |
| 9,896,106 B1 | 2/2018 | Wrobel et al. |
| 9,937,860 B1 | 4/2018 | Moradi-Pari et al. |
| 9,951,487 B1 | 4/2018 | Gonzalez De Cosio Leal |
| 10,139,244 B2 | 11/2018 | Schilling et al. |
| 10,349,011 B2 | 7/2019 | Du et al. |
| 10,484,848 B2 | 11/2019 | Cavalcanti et al. |
| 10,575,151 B2 | 2/2020 | Tawadrous et al. |
| 10,577,762 B2 | 3/2020 | Abu Al-Rubb |
| 10,745,870 B2 | 8/2020 | Kiang et al. |
| 2002/0080618 A1 * | 6/2002 | Kobayashi ............. B60Q 1/085 362/466 |
| 2003/0016143 A1 | 1/2003 | Ghazarian |
| 2003/0107323 A1 * | 6/2003 | Stam ....................... B60Q 1/10 315/82 |
| 2003/0195704 A1 | 10/2003 | Sekiguchi |
| 2005/0063779 A1 | 3/2005 | Yang |
| 2007/0276600 A1 | 11/2007 | King et al. |
| 2008/0266396 A1 | 10/2008 | Stein |
| 2011/0298603 A1 | 12/2011 | King et al. |
| 2012/0282024 A1 | 11/2012 | Hua |
| 2013/0188258 A1 | 7/2013 | Mathieu et al. |
| 2013/0209169 A1 | 8/2013 | Chew et al. |
| 2014/0222280 A1 | 8/2014 | Salomonsson et al. |
| 2015/0003087 A1 | 1/2015 | Futamura et al. |
| 2015/0042226 A1 | 2/2015 | Hibino |
| 2015/0216021 A1 | 7/2015 | Bennett et al. |
| 2015/0360601 A1 * | 12/2015 | Chambers ............. B60Q 1/143 701/49 |
| 2015/0381751 A1 | 12/2015 | Haran |
| 2016/0036917 A1 | 2/2016 | Koravadi et al. |
| 2016/0185347 A1 | 6/2016 | Lefevre et al. |
| 2016/0232414 A1 | 8/2016 | Salomonsson et al. |
| 2016/0236611 A1 * | 8/2016 | Langkabel ........... B60Q 1/1423 |
| 2016/0266242 A1 * | 9/2016 | Gilliland ............... G01S 7/4814 |
| 2016/0288699 A1 * | 10/2016 | Solar ..................... B60W 30/14 |
| 2016/0318490 A1 | 11/2016 | Ben Shalom |
| 2016/0343254 A1 * | 11/2016 | Rovik .................. G01J 1/0488 |
| 2016/0363647 A1 | 12/2016 | Zeng et al. |
| 2017/0025012 A1 | 1/2017 | Thompson et al. |
| 2017/0066374 A1 | 3/2017 | Hoye |
| 2017/0113550 A1 | 4/2017 | Li et al. |
| 2017/0113665 A1 | 4/2017 | Mudalige et al. |
| 2017/0132935 A1 | 5/2017 | Xu et al. |
| 2017/0206426 A1 | 7/2017 | Schrier et al. |
| 2017/0214747 A1 | 7/2017 | Schulte et al. |
| 2017/0217421 A1 | 8/2017 | Theodosis et al. |
| 2017/0369055 A1 | 12/2017 | Seigusa et al. |
| 2018/0129215 A1 | 5/2018 | Hazelton et al. |
| 2018/0174449 A1 | 6/2018 | Nguyen |
| 2018/0222391 A1 | 8/2018 | Chen |
| 2018/0253613 A1 | 9/2018 | Fung et al. |
| 2018/0253968 A1 | 9/2018 | Yalla |
| 2018/0297470 A1 * | 10/2018 | Kim ....................... B60K 35/00 |
| 2018/0312164 A1 | 11/2018 | Sasabuchi |
| 2019/0018419 A1 | 1/2019 | Lee et al. |
| 2019/0066490 A1 | 2/2019 | Skvarce |
| 2019/0364402 A1 | 11/2019 | Lee |
| 2019/0367048 A1 | 12/2019 | Koshida et al. |
| 2019/0384870 A1 | 12/2019 | Shiraishi et al. |
| 2019/0394625 A1 | 12/2019 | Kim et al. |
| 2020/0013283 A1 | 1/2020 | Sato et al. |
| 2020/0026284 A1 | 1/2020 | Hiramatsu et al. |
| 2020/0062074 A1 | 2/2020 | Macneille et al. |
| 2020/0066159 A1 | 2/2020 | Chase |
| 2020/0079363 A1 | 3/2020 | Frederick et al. |
| 2020/0079386 A1 | 3/2020 | Kim |
| 2020/0092694 A1 | 3/2020 | Chen et al. |
| 2020/0096359 A1 | 3/2020 | Sakr et al. |
| 2020/0180612 A1 | 6/2020 | Finelt et al. |
| 2020/0192355 A1 | 6/2020 | Lu |
| 2020/0211372 A1 | 7/2020 | Nabrotsky |
| 2020/0236521 A1 | 7/2020 | Vassilovski et al. |
| 2020/0263372 A1 | 8/2020 | Nastev |
| 2020/0380868 A1 | 12/2020 | Bhunia et al. |
| 2021/0009027 A1 * | 1/2021 | Mulligan ............... B60Q 1/143 |
| 2021/0027629 A1 * | 1/2021 | Tao ...................... G05D 1/0214 |

FOREIGN PATENT DOCUMENTS

| | | | |
|---|---|---|---|
| CN | 111284394 A * | 6/2020 | |
| DE | 19756574 A1 * | 10/1998 | ............. B60Q 1/143 |
| DE | 10164193 A1 * | 7/2002 | ............... B60Q 1/18 |
| DE | 102012200040 A1 * | 7/2013 | ............... B60Q 1/10 |
| DE | 102012200048 A1 * | 7/2013 | ........... G06K 9/2027 |
| EP | 1451038 A1 * | 9/2004 | ............. F21S 41/25 |
| EP | 1504956 A2 * | 2/2005 | ............... B60Q 1/18 |
| EP | 3093193 A1 * | 11/2016 | ............... B60Q 1/50 |
| EP | 3109095 A1 * | 12/2016 | ............ F21S 41/645 |
| EP | 3343095 A1 * | 7/2018 | ............ F21S 41/365 |
| EP | 3343097 A1 * | 7/2018 | ............ B60Q 1/1438 |
| KR | 20150134793 A * | 12/2015 | |
| KR | 20180076209 A * | 7/2018 | ............ F21S 41/285 |
| WO | WO-2013102524 A1 * | 7/2013 | ............... B60Q 1/10 |
| WO | WO-2013102526 A1 * | 7/2013 | ......... G06K 9/00825 |
| WO | WO-2016046209 A1 * | 3/2016 | ............... B60Q 1/12 |
| WO | WO-2016203911 A1 * | 12/2016 | ............... B60Q 1/14 |
| WO | WO-2017073250 A1 * | 5/2017 | ............... B60Q 1/24 |
| WO | WO-2017141395 A1 * | 8/2017 | ............... B60Q 1/14 |

OTHER PUBLICATIONS

Event Data Recorder _ NHTSA.pdf, Apr. 23, 2018, https://www.nhtsa.gov/research-data/event-data-recorder (The Wayback Machine—https://www.nhtsa.gov/research-data/event-data-recorder), 4 pages.

R. Miucic, A. Sheikh, Z Medenica and R. Kunde, "V2X Applications Using Collaborative Perception," 2018 IEEE 88th Vehicular Technology Conference (VTC-Fall), Chicago, IL, USA, 2018, 6 pages.

Code of Federal Regulations, Title 49, vol. 6, Part 571, Federal Motor Vehicle Safety Standards, 2014, https://vww.govinfo.gov/app/details/CFR-2014-title49-vol6/CFR-2014-title49-vol.6-part571, Retrieved Jul. 27, 2021, 4 Pages.

Department of Transportation, National Highway Traffic Safety Administration, 49 CFR Part 571, Docket No. NHTSA-2016-0126, Federal Motor Vehicle Safety Standards—V2V Communications, Notice of Proposed Rulemaking, Federal Register, vol. 82, No. 8, Jan. 12, 2017, Proposed Rules, https://www.federalregister.gov/iocuments/2017/01/12/2016-31059/federal-motor-vehicle-safety-standards-v2v-communications, 166 Pages (in 3 parts).

Society of Automotive Engineers, SAE J2945/1, On-Board System Requirements for V2V Safety Communications, Mar. 2016, 127 Pages (in 2 parts).

(56) References Cited

OTHER PUBLICATIONS

TE, "Traffic Calming Measures," Institute of Transportation Engineers, Archived from the original on 2007-03-20, URL https://web.archive.org/web/20170729064350/http:/lwww.ite.org/traffic/hump.asp, Retrieved May 29, 2020, 2 Pages.

Allyn, Bobby, "Apple iPhones Can Soon Hold Your ID. Privacy Experts Are On Edge," NPR, Jun. 12, 2021, url https://www.npr.org/2021/06/12/1005624457/apple-iphones-can-soon-hold-your-id-prvacy-experts-are-on-edge, last accessed Sep. 2, 2021, 13 Pages.

Lee, Alicia, "Tell Siri you're getting pulled over and this iPhone shortcut will record your interaction with the police," CNN, Jun. 16, 2020, url: https://www.cnn.com/2020/06/16/US/iphone-police-shortcut-record-tmd/index.html, last accessed Sep. 2, 2021, 6 Pages.

Elassar, Alaa," The ACLU created an app to help people record police misconduct," CNN, May 31, 2020, url: https://Aww.cnn.com/2020/05/31/US/aclu-mobile-justice-police-misconduct-app/index.html, last accessed Sep. 2, 2021, 3 Pages.

OnStar Public Safety, https://www.public-safety.onstar.com/emergency-situations/, last accessed Oct. 7, 2021, 9 pages.

\* cited by examiner

FIG. 2C
Curve Condition

FIG. 2B
Overtaking Condition

FIG. 2A
Approach Condition

SYSTEM AND METHOD FOR CONTROLLING OPERATION OF HEADLIGHTS IN A HOST VEHICLE

TECHNICAL FIELD

The following relates to a system and method for controlling operation of headlights in a host vehicle using V2X/CV2X communications.

BACKGROUND

Vehicle drivers using headlight high beams turned on at night often forget to switch them off and use the low beam setting when either heading towards an oncoming car or overtaking another car from behind. The driver in the other car can be greatly distracted or temporarily blinded by the bright light from the high beams, which can cause a safety issue due to lost or diminished vision for the driver of another vehicle.

Various automatic systems have been designed to dim the high beams. Such system may use technologies including imaging sensors, analog ambient light sensors, digital camera and vehicle recognition algorithms, and/or moveable headlights. Such systems rely on Line of Sight (LOS) conditions between the two vehicles and work only in a "head-on" approach configuration, not in an overtaking-from-behind configuration. Such systems also do not work reliably when hilly terrain or slight corners are encountered because the oncoming vehicle is not visible at a distance (i.e., Non-Line of Sight (NLOS) conditions). Moreover, analog systems may need to be adjusted manually for sensitivity by the driver, depending on the conditions. A result is that the high beams remain turned on or may be dimmed at the last second when the approaching car is finally detected, still potentially temporarily blinding the oncoming driver.

Vehicle-to-everything (V2X) communication, including cellular vehicle-to-everything (CV2X) communication, is the passing of information from a vehicle to any entity that may affect the vehicle, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), Vehicle-to-Device (V2D), and Vehicle-to-Grid (V2G). The main motivations for V2X communication are road safety, traffic efficiency, and energy savings.

There are two types of V2X communication technology depending on the underlying technology being used. One is Dedicated Short Range Communication (DSRC) Wireless Local Area Network (WLAN) based, and the other is cellular based. V2X communication may use WLAN technology and work directly between vehicles, which form a vehicular ad-hoc network as two V2X transmitters come within each range of each other. Hence it does not require any infrastructure for vehicles to communicate, which is key to assure safety in remote or little developed areas.

WLAN is particularly well-suited for V2X communication, due to its low latency. It transmits messages known as Cooperative Awareness Messages (CAM) and Decentralized Environmental Notification Messages (DENM) or Basic Safety Message (BSM). The data volume of these messages is very low. The radio technology is part of the WLAN 802.11 family of standards developed by the Institute of Electrical and Electronics Engineers (IEEE) and known in the United States as Wireless Access in Vehicular Environments (WAVE) and in Europe as ITS-G5.

A need therefore exists for an improved system and method capable of automatically controlling operation of headlights in a host vehicle that would use data from V2X communications, such as CV2X communications, and overcome problems associated with current systems and methods for dimming vehicle headlight high beams. Such an improved system and method would use position, heading, and speed information transmitted between two vehicles for the V2X safety system to determine if an approach, overtaking, curve, or hill condition exist and automatically dim and restore headlight high beam settings based on such determinations.

SUMMARY

According to one non-limiting exemplary embodiment described herein, a system is provided for controlling operation of headlights in a host vehicle, the host vehicle headlights having a low-beam operating state and a high-beam operating state. The system comprises a communication unit adapted to be mounted in the host vehicle and configured to receive a vehicle-to-x communication comprising data indicative of a characteristic of a second vehicle, and a controller adapted to be mounted in the host vehicle and provided in communication with the communication unit. The controller is configured to determine that a high-beam is generated by the host vehicle headlights, determine a state of the second vehicle based on the data indicative of the characteristic of the second vehicle, determine a state of the host vehicle based on data indicative of a characteristic of the host vehicle, determine that a pre-defined condition exists involving the host vehicle and the second vehicle based on the state of the second vehicle and the state of the host vehicle, and, in response to the determination that the high-beam is generated and the determination that the pre-defined condition exists, generate a headlight control signal, wherein the headlight control signal effectuates an automatic change of operating state of the host vehicle headlights from the high-beam operating state to the low-beam operating state.

According to another non-limiting exemplary embodiment described herein, a method is provided for controlling operation of headlights in a host vehicle, the host vehicle headlights having a low-beam operating state and a high-beam operating state, the host vehicle comprising a communication unit and a controller, the communication unit provided in communication with the controller. The method comprises receiving, by the communication unit, a vehicle-to-x communication comprising data indicative of a characteristic of a second vehicle, and determining, by the controller, that a high-beam is generated by the host vehicle headlights. The method also comprises determining, by the controller, a state of the second vehicle based on the data indicative of the characteristic of the second vehicle, determining, by the controller, a state of the host vehicle based on data indicative of a characteristic of the host vehicle, and determining, by the controller, that a pre-defined condition exists involving the host vehicle and the second vehicle based on the state of the second vehicle and the state of the host vehicle. The method further comprises, in response to determining that the high-beam is generated and determining that the pre-defined condition exists, generating, by the controller, a headlight control signal, wherein the headlight control signal effectuates an automatic change of operating state of the host vehicle headlights from the high-beam operating state to the low-beam operating state.

According to yet another non-limiting exemplary embodiment described herein, a system is provided for controlling operation of headlights in a host vehicle, the host vehicle headlights having a low-beam operating state and a high-beam operating state. The system comprises a communication unit adapted to be mounted in the host vehicle and configured to receive a vehicle-to-x communication comprising data indicative of a state of a second vehicle, and a controller adapted to be mounted in the host vehicle and provided in communication with the communication unit. The controller is configured to determine that a high-beam is generated by the host vehicle headlights, determine a state of the second vehicle based on the data indicative of the characteristic of the second vehicle, determine a state of the host vehicle based on data indicative of a characteristic of the host vehicle, determine that a pre-defined condition exists involving the host vehicle and the second vehicle based on the state of the second vehicle and the state of the host vehicle, and, in response to the determination that the high-beam is generated and the determination that the pre-defined condition exists, generate a headlight alert signal, wherein the headlight alert signal effectuates a warning to a driver of the host vehicle that the pre-defined condition exists.

A detailed description of these and other non-limiting exemplary embodiments of a system and method for controlling operation of headlights in a host vehicle is set forth below together with the accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to FIGS. 1-5, a more detailed description of non-limiting exemplary embodiments of a system and method for controlling operation of headlights in a host vehicle will be provided. For ease of illustration and to facilitate understanding, like reference numerals have been used herein for like components and features throughout the drawings.

As previously described, vehicle drivers often forget to switch off headlight high beams and use the low beam setting when approaching an oncoming car or overtaking another car from behind, which can cause a safety issue due to lost or diminished vision for the driver of another vehicle. Various automatic systems have been designed to dim the high beams and may use technologies including imaging sensors, analog ambient light sensors, digital camera and vehicle recognition algorithms, and/or moveable headlights. However, a number of problems are associated with such systems. For example, such systems rely on Line of Sight (LOS) conditions between the two vehicles and work only in a "head-on" approach configuration, not in an overtaking-from-behind configuration. Such systems also do not work reliably when hilly terrain or slight corners are encountered because the oncoming vehicle is not visible at a distance (i.e., Non-Line of Sight (NLOS) conditions). Moreover, analog systems may need to be adjusted manually for sensitivity by the driver, depending on the conditions. A result is that high beams may remain on or may be dimmed at the last second when the approaching car is finally detected, still potentially distracting or temporarily blinding the oncoming driver.

As also previously described, vehicle-to-everything (V2X) communication, including cellular vehicle-to-everything (CV2X) communication, is the passing of information from a vehicle to any entity that may affect the vehicle, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), Vehicle-to-Device (V2D), and Vehicle-to-Grid (V2G). V2X communication is designed to improve road safety, traffic efficiency, and energy savings, and may be implemented using Dedicated Short Range Communication (DSRC) Wireless Local Area Network (WLAN) technology, or alternatively cellular technology. V2X communication may use WLAN technology and work directly between vehicles, which form a vehicular ad-hoc network as two V2X transmitters come within each range of each other. Hence it does not require any infrastructure for vehicles to communicate, which is key to assure safety in remote or little developed areas. WLAN is particularly well-suited for V2X communication, due to its low latency. It transmits messages known as Cooperative Awareness Messages (CAM) and Decentralized Environmental Notification Messages (DENM) or Basic Safety Message (BSM). The data volume of these messages is very low. The radio technology is part of the WLAN 802.11 family of standards developed by the Institute of Electrical and Electronics Engineers (IEEE) and known in the United States as Wireless Access in Vehicular Environments (WAVE) and in Europe as ITS-G5.

The system and method of the present disclosure for controlling operation of headlights in a host vehicle overcome problems associated with current systems and methods designed to dim the high beams by utilizing data from V2X communications, such as CV2X communications. The system and method of the present disclosure may use position (e.g., Global Navigation Satellite System (GNSS) position), heading, and speed information transmitted between two vehicles for the V2X safety system to calculate the trajectories of the headlight beams and to determine if an approach, overtaking, curve, or hill condition exist between the two vehicles. Such V2X data is transmitted every 100 milliseconds and such determinations can be used by the system and method of the present disclosure to automatically dim and restore headlight high beam settings.

In general, if pre-defined geometric criteria and limits are met for a calculated trajectory, then a high beam dimming condition exists and a network message (e.g., Controller Area Network (CAN)) may be sent to an appropriate Body Control Module (BCM) or Instrumentation Module (IM) in the host vehicle to automatically dim the host vehicle headlights. The system and method of the present disclosure may continue to analyze data provided in the V2X data and calculate headlight beam trajectories as the two vehicles move relative to each other. As the updated computed trajectories indicate that the vehicles are moving out of range of the pre-defined geometric criteria and limits, another network message may be sent to automatically restore the high beam setting.

Thus, as the vehicles encounter each other on their respective routes, the system and method of the present disclosure may automatically dim the high beams only for the time it was likely a driver would be temporarily blinded, and then may automatically restore the high beams Optionally, the automatic nature of this headlight dimming may be disabled by the driver, through a User Interface that overrides the automatic control. As well, a warning indicator or message on the instrument cluster or elsewhere may optionally be employed to alert the driver that the system has detected a potentially temporarily blinding situation, whether dimming of the high beams is accomplished automatically or left for manual control by the driver.

Figure 1:
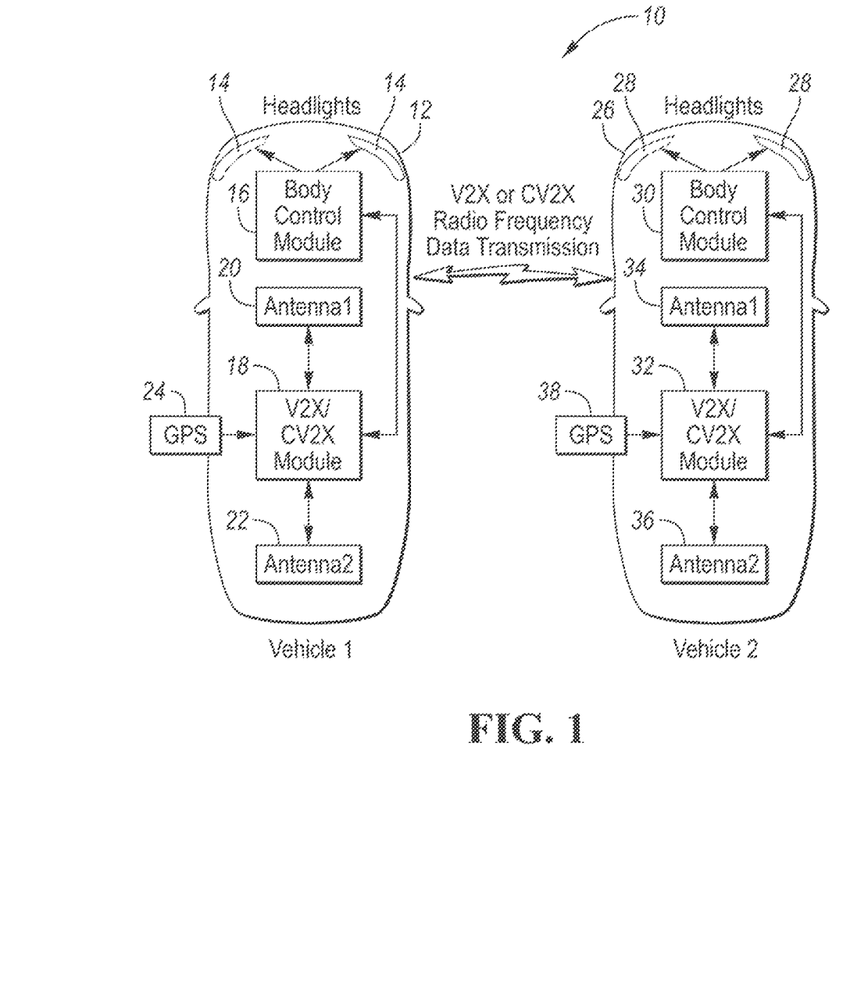
FIG. 1 is a block diagram of a system for controlling operation of headlights in a host vehicle according to one non-limiting exemplary embodiment of the present disclosure.

Referring now to FIG. 1, a block diagram of a system 10 for controlling operation of headlights in a host vehicle according to one non-limiting exemplary embodiment of the present disclosure is shown. As seen therein, a first vehicle 12 (Vehicle 1) may comprise headlights 14, a body control module (BCM) 16, a V2X/CV2X module 18, a first antenna 20 (Antenna1), a second antenna 22 (Antenna2), and a Global Positioning System (GPS) or other GNSS unit 24. The BCM 16 may be provided in communication with and configured to control the headlights 14. The BCM 16 may also be provided in communication with the V2X/CV2X module 18, which itself may be provided in communication with the first and second antennas 20, 22 and the GPS 24.

Similarly, a second vehicle 26 (Vehicle 2) may also comprise headlights 28, a body control module (BCM) 30, a V2X/CV2X module 32, a first antenna 34 (Antenna1), a second antenna 36 (Antenna2), and a Global Positioning System (GPS) other GNSS unit 38. The headlights 28, BCM 30, V2X/CV2X module 32, first and second antennas 34, 36, and GPS 38 of the second vehicle 26 may be provided in communication and configured similarly to the headlights 14, BCM 16, V2X/CV2X module 18, first and second antennas 20, 22, and GPS 24 of the first vehicle 12 as described above.

It should be noted that either of the first or second vehicles 12, 26 may be referred to as a host vehicle. It should also be noted that the description herein of the system 10 and method of the present disclosure in connection with the first and second vehicles 12, 26 is exemplary only, and that the system 10 and method of the present disclosure may be utilized or implemented with any number of vehicles.

Each of the V2X/CV2X modules 18, 32 may be configured to enable and control communication between the first and second vehicles 12, 26 (i.e., V2V communication) or between the first or second vehicle 12, 26 and another node or device (e.g., Vehicle-to-Infrastructure (V2I), Vehicle-to-Network (V2N), Vehicle-to-Pedestrian (V2P), Vehicle-to-Device (V2D), or Vehicle-to-Grid (V2G)). Such communication is accomplished utilizing radio frequency signals for transmission of data according to known techniques, protocols, and/or standards associated with such communication. In that regard, the first and/or second antennas 20, 22, 34, 36 of the first and second vehicles 12, 26 may be configured for transmitting and receiving DSRC WLAN or cellular radio frequency signals. Similarly, the GPS or other GNSS units 24, 38 of the first and second vehicles 12, 26 may be configured and operate in any known fashion, including providing for wireless GNSS communication.

Each V2X/CV2X module 18, 32 may also be referred to as a communication unit that may be configured to transmit and receiving wireless V2X/CV2X radio frequency communications as described herein. Similarly, each BCM 16, 30 may include a communication interface or communication unit that may be configured to receive wired communication signals from its respective V2X/CV2X module 18, 32 over any vehicle bus, such as a Controller Area Network (CAN) bus.

As those skilled in the art will understand, the BCM 16, 30 and/or the V2X/CV2X modules 18, 32 of the first and second vehicles 12, 26, as well as any other module, controller, control unit, system, subsystem, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithm or algorithms represented by the various functions and/or operations described herein, including interaction between and/or cooperation with each other. One or more of such processors, as well as other circuitry and/or hardware, may be included in a single Application-Specific Integrated Circuitry (ASIC), or several processors and various circuitry and/or hardware may be distributed among several separate components, whether individually packaged or assembled into a System-on-a-Chip (SoC). The BCM 16, 30 and/or the V2X/CV2X modules 18, 32 may therefore comprise a processor and an associated storage medium having stored computer executable instructions for performing the particular algorithm or algorithms represented by the various functions and/or operations described herein.

All V2X/CV2X communications include a Basic Safety Message (BSM). As part of each BSM, a DSRC device, such as V2X/CV2X module 18, 32, must transmit (i) Longitudinal and latitudinal location within 1.5 meters of the actual position at a Horizontal Dilution of Precision (HDOP) smaller than 5 within the 1 sigma absolute error; and (ii) Elevation location within 3 meters of the actual position at a Horizontal Dilution of Precision (HDOP) smaller than 5 within the 1 sigma absolute error. As part of each BSM, a DSRC device must also transmit speed, heading, acceleration, and yaw rate. Speed must be reported in increments of 0.02 m/s, within 1 km/h (0.28 m/s) of actual vehicle speed. Heading must be reported accurately to within 2 degrees when the vehicle speed is greater than 12.5 m/s (~28 mph), and to within 3 degrees when the vehicle speed is less than or equal to 12.5 m/s. Additionally, when the vehicle speed is below 1.11 m/s (~2.5 mph), the DSRC device must latch the current heading and transmit the last heading information prior to the speed dropping below 1.11 m/s. The DSRC device is to unlatch the latched heading when the vehicle speed exceeds 1.39 m/s (~3.1 mph) and transmit a heading within 3 degrees of its actual heading until the vehicle reaches a speed of 12.5 m/s where the heading must be transmitted at 2 degrees accuracy of its actual heading. Horizontal (longitudinal and latitudinal) acceleration must be reported accurately to 0.3 m/s$^2$, and vertical acceleration must be reported accurately to 1 m/s$^2$. Yaw rate must be reported accurately to 0.5 degrees/second.

In addition, a Path History data frame will be transmitted as a required BSM element at the operational frequency of the BSM transmission. The Path History data frame requires a history of past vehicles Global Navigation Satellite System (GNSS) locations as dictated by GNSS data elements including Coordinated Universal Time (UTC) time, latitude, longitude, heading, elevation sampled at a periodic time interval of 100 ms and interpolated in-between by circular arcs, to represent the recent movement of the vehicle over a limited period of time or distance. Path History points should be incorporated into the Path History data frame such that the perpendicular distance between any point on the vehicle path and the line connecting two consecutive PH points shall be less than 1 m. The number of Path History points that a vehicle should report is the minimum number of points so that the represented Path History distance (i.e., the distance between the first and last Path History point) is at least 300 m and no more than 310 m, unless initially there is less than 300 m of Path History. If the number of Path History points needed to meet both the error and distance requirements stated above exceeds the maximum allowable number of points (23), the Path History data frame shall be populated with only the 23 most recent points from the computed set of points. A Path History data frame shall be populated with time-ordered Path History points, with the first Path History point being the closest in time to the current UTC time, and older points following in the order in which they were determined.

Path Prediction trajectories will also be transmitted as a required BSM element at the operational frequency of the BSM transmission. Trajectories in a Path Prediction data frame are represented, at a first order of curvature approximation, as a circle with a radius, R, and an origin located at (0,R), where the x-axis is aligned with the perspective of the transmitting vehicle and normal to the vertical axis of the vehicle. The radius, R, will be positive for curvatures to the right when observed from the perspective of the transmitting vehicle, and radii exceeding a maximum value of 32,767 are to be interpreted as a "straight path" prediction by receiving vehicles. When a DSRC device is in steady state conditions over a range from 100 m to 2,500 m in magnitude, the subsystem will populate the Path Prediction data frame with a calculated radius that has less than 2% error from the actual radius. For the purposes of this performance requirement, steady state conditions are defined as those which occur when the vehicle is driving on a curve with a constant radius and where the average of the absolute value of the change of yaw rate over time is smaller than 0.5 deg/s$^2$. After a transition from the original constant radius (R1) to the target constant radius (R2), the subsystem shall repopulate the Path Prediction data frame within four seconds under the maximum allowable error bound defined above.

The foregoing and other details concerning V2X/CV2X communications relating to Federal Motor Vehicle Safety Standards are set forth at 49 CFR (Code of Federal Regulations) Part 571 as well as the Notice of Proposed Rulemaking (NPRM), National Highway Transportation Safety Association Docket No. NHTSA-2016-0126, which are incorporated by reference herein in their entireties. Also incorporated herein by reference in its entirety is the DSRC standard of the Society of Automotive Engineers, SAE J2945/1, relating to on-board system requirements for V2V safety communications, including FIGS. 27 and 30 concerning concise and actual path history representation and representation of estimated radius calculations.

Figure 2A:
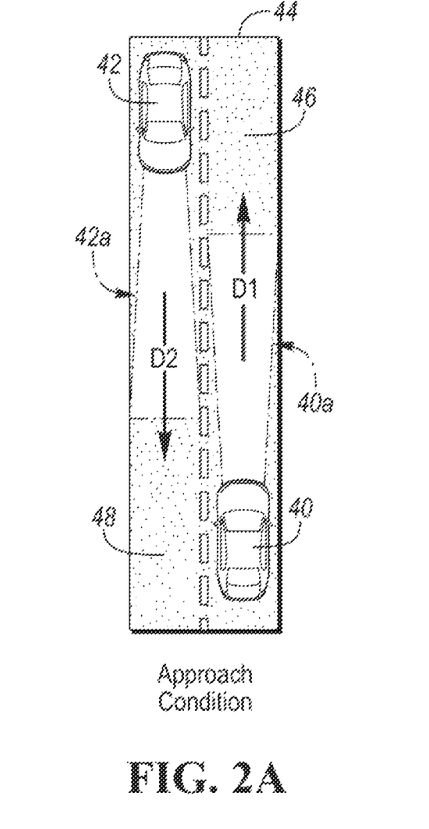
FIG. 2A is an illustration of an approach condition involving a host vehicle and a secondary vehicle in a system and method for controlling operation of headlights in a host vehicle according to one non-limiting exemplary embodiment of the present disclosure.

FIGS. 2A-2D illustrate approach, overtake, curve, and hill conditions involving a host vehicle and a secondary vehicle in a system and method for controlling operation of headlights in a host vehicle according to one non-limiting exemplary embodiment of the present disclosure. As seen in FIG. 2A, a driving condition involving a host vehicle 40 and a second vehicle 42 is illustrated which may be referred to as an approach condition. More specifically, the host vehicle 40 and the second vehicle 42 are traversing or moving along a road 44 in lanes 46, 48 having opposite traffic directions (D1, D2). As a result, the host vehicle 40 is approaching the second vehicle 42 as the distance between the vehicles 40, 42 decreases. The host vehicle 40 may have a headlight beam pattern or trajectory 40a, while the second vehicle may have a headlight beam pattern or trajectory 42a.

Figure 2B:
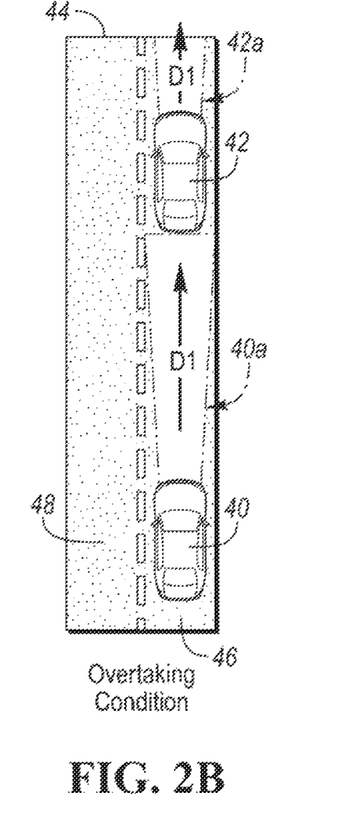
FIG. 2B is an illustration of an overtake condition involving a host vehicle and a secondary vehicle in a system and method for controlling operation of headlights in a host vehicle according to one non-limiting exemplary embodiment of the present disclosure.

As seen in FIG. 2B, a driving condition involving a host vehicle 40 and a second vehicle 42 is illustrated which may be referred to as an overtaking condition. More specifically, the host vehicle 40 and the second vehicle 42 are traversing or moving along a road 44 in a lane or lanes 46, 48 having the same traffic direction (D1). Due to a relative speed and/or acceleration difference between the host vehicle 40 and the second vehicle 42, the host vehicle 40 is overtaking the second vehicle 42 as the distance between the vehicles 40, 42 decreases. Here again, the host vehicle 40 may have a headlight beam pattern or trajectory 40a, while the second vehicle may have a headlight beam pattern or trajectory 42a.

Figure 2C:
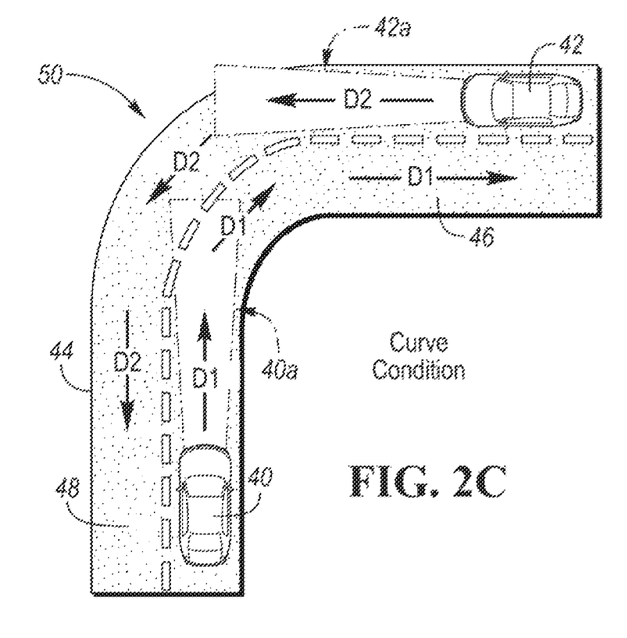
FIG. 2C is an illustration of a curve condition involving a host vehicle and a secondary vehicle in a system and method for controlling operation of headlights in a host vehicle according to one non-limiting exemplary embodiment of the present disclosure.

As seen in FIG. 2C, a driving condition involving a host vehicle 40 and a second vehicle 42 is illustrated which may be referred to as a curve condition or a road curve condition. More specifically, the host vehicle 40 and the second vehicle 42 are traversing or moving along a road 44 in lanes 46, 48 having opposite traffic directions (D1, D2). As a result, the host vehicle 40 is approaching the second vehicle 42 as the distance between the vehicles 40, 42 decreases. However, the road 44 also includes a curve 50 between the position of the host vehicle 40 and the position of the second vehicle 42. The curve 50 in the road 44 between the host vehicle 40 and the second vehicle 42 may create a non-line-of-sight (NLOS) condition in which the driver of the host vehicle 40 cannot see the oncoming second vehicle 42, at least until the host vehicle 40 and/or the second vehicle 42 has or have entered or traversed the curve 50. The curve condition thus represents a specific type of approach condition described above in connection with FIG. 2A. Once again, the host vehicle 40 may have a headlight beam pattern or trajectory 40a, while the second vehicle may have a headlight beam pattern or trajectory 42a.

Figure 2D:
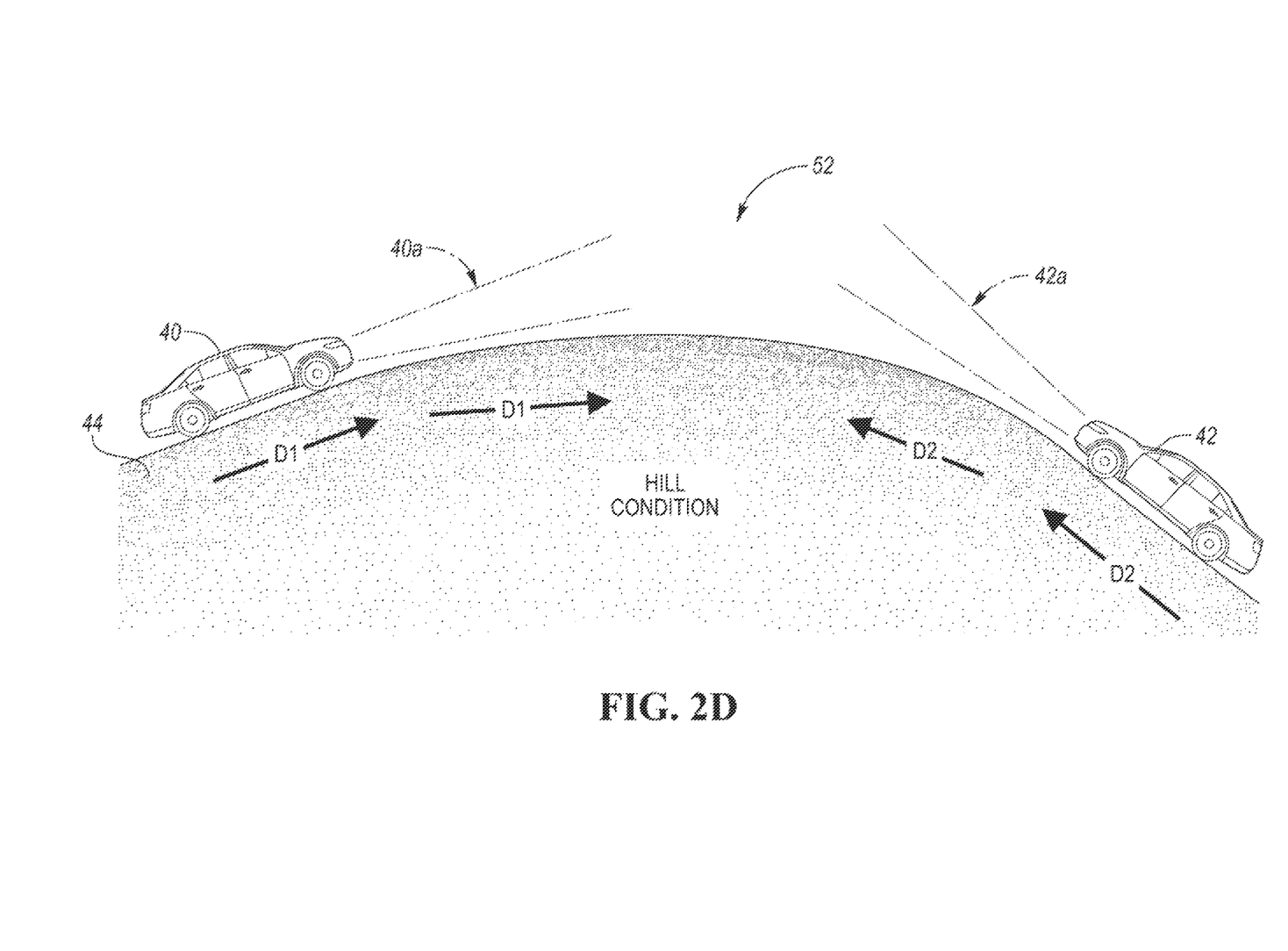
FIG. 2D is an illustration of a hill condition involving a host vehicle and a secondary vehicle in a system and method for controlling operation of headlights in a host vehicle according to one non-limiting exemplary embodiment of the present disclosure.

As seen in FIG. 2D, a driving condition involving a host vehicle 40 and a second vehicle 42 is illustrated which may be referred to as a hill condition or a road hill condition. More specifically, the host vehicle 40 and the second vehicle 42 are traversing or moving along a road 44 in lanes 46, 48 having opposite traffic directions (D1, D2). As a result, the host vehicle 40 is approaching the second vehicle 42 as the distance between the vehicles 40, 42 decreases. However, the road 44 also includes a hill 52 between the position of the host vehicle 40 and the position of the second vehicle 42. The hill 52 in the road 44 between the host vehicle 40 and the second vehicle 42 may create a non-line-of-sight (NLOS) condition in which the driver of the host vehicle 40 cannot see the oncoming second vehicle 42, at least until the host vehicle 40 and/or the second vehicle 42 has or have crested or traversed the hill 52. The hill condition thus represents a specific type of approach condition described above in connection with FIG. 2A. Here again, the host vehicle 40 may have a headlight beam pattern or trajectory 40a, while the second vehicle may have a headlight beam pattern or trajectory 42a.

Figure 3:
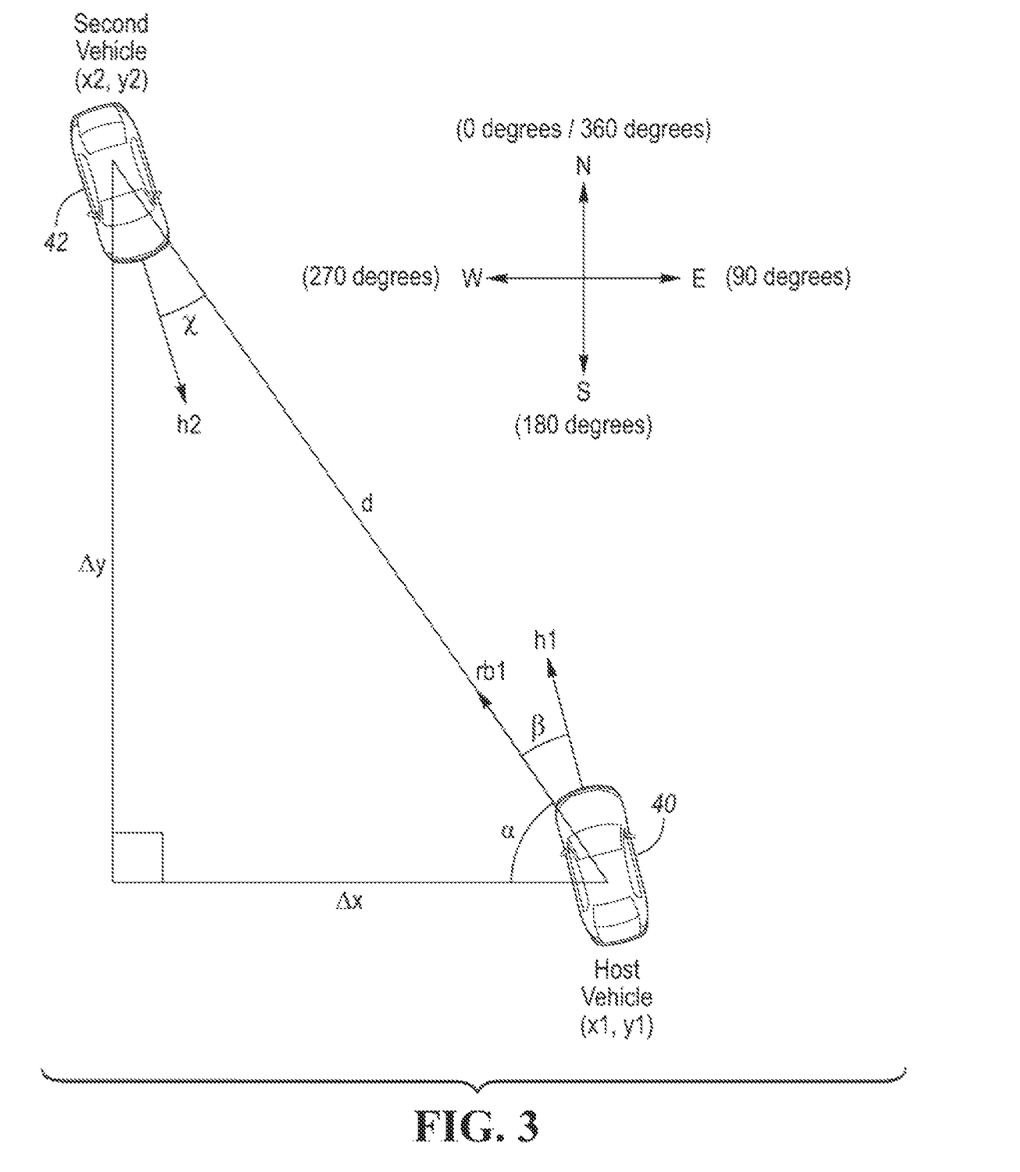
FIG. 3 is a simplified block diagram of a host vehicle and a secondary vehicle in a system and method for controlling operation of headlights in a host vehicle according to one non-limiting exemplary embodiment of the present disclosure.

Referring now to FIG. 3, a simplified block diagram of a host vehicle 40 and a second vehicle 42 in a system and method for controlling operation of headlights in a host vehicle 40 according to one non-limiting exemplary embodiment of the present disclosure is shown. In general, FIG. 3 illustrates the geometry and various parameters in connection with a host vehicle 40 and a second vehicle 42, including the distance (d) between the vehicles, relative bearing (rb1), and what may be referred to as "trajectory offset angles" (β) and (χ) to the relative bearing (rb1), which may be used to determine if a high beam dimming condition exists through rationality checks and table lookups. FIG. 3 assumes general navigation practices of using degrees and compass headings of 0 to 360. The geometry has been simplified from the spherical shape of the earth to a flat, two-dimensional plane, given that the error is extremely small when the host vehicle 40 and the second vehicle 42 are only ~1 km apart versus the ~40,000 km circumference of the earth.

Thus, compass bearing references for FIG. 3 are North=0° or 360°, East=90°, South=180°, and West=270°. As seen therein, the calculated coordinates of the host vehicle 40 are (x1, y1) and the calculated coordinates of the second vehicle 42 are (x2, y2). The heading and trajectory of the host vehicle is h1 and the heading and trajectory of the second vehicle is h2. In that regard, the conversion of the latitude and longitude of each of the host vehicle 40 and the second vehicle 42, which may be obtained from GPS 24, 38, to an (x, y) location is well known to those of ordinary skill and therefore is not described herein for the sake of brevity.

With continuing reference to FIG. 3, the East/West x-axis distance between the host vehicle 40 and the second vehicle 42 is (Δx) and North/South y-axis distance between the host vehicle 40 and the second vehicle 42 is (Δy). That x-axis distance (Δx) and y-axis distance (Δy) are calculated according to:

$$\Delta x=|x1-x2|$$

$$\Delta y=|y1-y2|$$

The straight-line distance between the host vehicle 40 and the second vehicle 42 is represented by (d). That straight line distance (d) is calculated according to:

$$d=\sqrt{(\Delta x^2+\Delta y^2)}$$

The East/West axis angle from the host vehicle 40 to the second vehicle 42 is represented by (α). That axis angle (α) is calculated according to:

$$\alpha=\arctan(\Delta y/\Delta x)$$

The relative bearing from the host vehicle 40 to the second vehicle 42 is represented by (rb1). That relative bearing (rb1) is calculated according to:

$$rb1=\text{MOD}((\alpha+270),360)$$

The trajectory offset angle of the host vehicle 40 from the relative bearing to the second vehicle 42 is represented by (β). That trajectory offset angle (β) of the host vehicle 40 is calculated according to:

$$\beta=\text{MOD}((|h1-rb1|),360)$$

The trajectory offset angle of the second vehicle 42 from the relative bearing to the second vehicle 42 is represented by (χ). That trajectory offset angle (χ) of the second vehicle 42 is calculated according to:

$$\chi=\text{MOD}((|h2-rb1+180|),360)$$

In regard to the previously noted rationality checks, if the calculated straight line distance (d) from the host vehicle 40 to the second vehicle 42 is greater than 2.5 km, the conditions are such that automatic headlight dimming is not required, due to the loss of brightness of the projected headlight light over the space between the vehicles 40, 42. The calculated distance (d) may be exceedingly large due to errors in the reported positions of the vehicles 40, 42, data corruption, loss of or multipath reception of GNSS signals, computational errors, or other causes. In that regard, DSRC RF communications have a minimum performance distance of 300 m, and radio transmission and reception range for DSRC RF communications is not expected to exceed ~1 km.

Moreover, if the host vehicle 40 trajectory offset angle (β) is between 45 and 315 degrees, the host vehicle 40 is either heading away from second vehicle 42 at a large angle (greater than 45 degrees) in an approaching or overtaking condition, or the host vehicle 40 is located in front of the second vehicle 42 travelling in the same direction. Each of these alternatives is a case where automatic headlight dimming is not required. Similarly, if the second vehicle 42 trajectory offset angle (χ) is between 45 and 135 degrees, or 225 and 315 degrees, the second vehicle 42 is heading away from the host vehicle 40 at a large angle (greater than 45 degrees) in an approaching or overtaking condition, which are again cases where automatic headlight dimming is not required.

After rationality checks are performed indicating a pre-determined condition may exist for automatic headlight dimming, a table lookup function may be used to define the performance of the proposed system, based on the calculated straight line distance (d) from the host vehicle 40 to the second vehicle 42, the host vehicle 40 trajectory offset angle (β), and the second vehicle 42 trajectory offset angle (χ). The lookup table may comprise pre-defined rows of data representing the calculated straight line distance (d) from the host vehicle 40 to the second vehicle 42 as the index for the table, and pairs of pre-defined trajectory offset angle values (β and χ) for each row in the table representing boundary values indicating a pre-determined condition may exist for automatic headlight dimming. As an example, a row entry of "1 km, 3 degrees, 10 degrees" would indicate that a predetermined condition may exist for automatic headlight dimming for a calculated straight line distance (d) of 1 km, if the actual host vehicle trajectory offset angle (β) is +/−3 degrees (i.e., between 0 and 3 degrees, or between 357 and 360 degrees) and the actual second vehicle trajectory offset angle (χ) is +/−10 degrees (i.e., between 0 and 10 degrees, or between 350 and 360 degrees).

With reference again to FIG. 2D, the hill condition or road hill condition shown therein may be inferred from inspection of, and calculating the magnitudes and signs of the differences between the elevations and/or vertical accelerations of the host vehicle 40 and the second vehicle 42, as reported in Basic Safety Messages (BSM), and comparing the calculated values to pre-defined threshold values. In that regard, in the approaching condition shown in FIG. 2D with the hill 52 between the host vehicle 40 and the second vehicle 42, the elevation of the host vehicle 40 would remain relatively constant and the vertical acceleration of the host vehicle 40 would be almost zero while moving in direction D1. The elevation of the second vehicle 42 would initially be much lower or less than the elevation of the host vehicle 40. While moving in direction D2, the elevation of the second vehicle 42 would also be increasing and the vertical acceleration of the second vehicle 42 would become a positive value.

In another example of an approaching condition involving a hill, the host vehicle 40 and the second vehicle 42 may be traveling in opposite directions on relatively flat portions of a road and approaching a hill located between the host vehicle 40 and the second vehicle 42. In such a scenario, the elevations of the host vehicle 40 and the second vehicle 42 may initially be the same and the vertical accelerations of the host vehicle 40 and the second vehicle 42 may be close to zero. However, the elevations and vertical accelerations of the host vehicle 40 and the second vehicle 42 would increase and/or become positive as the host vehicle 40 and the second vehicle 42 approach each other ascending opposite slopes of the hill.

Figure 4:
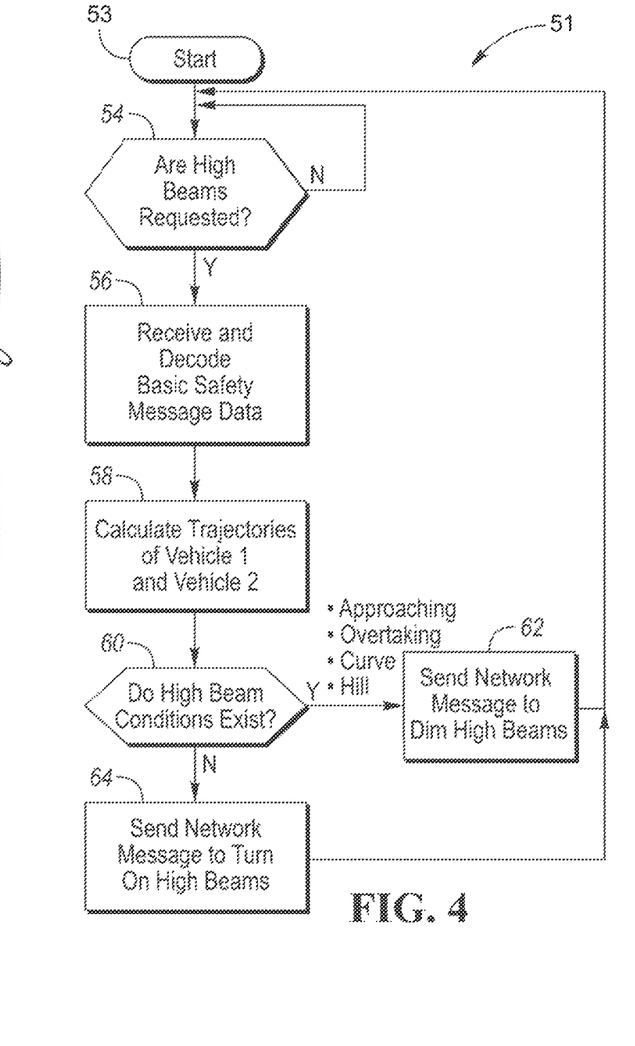
FIG. 4 is a flowchart of a method for controlling operation of headlights in a host vehicle according to one non-limiting exemplary embodiment of the present disclosure.

Referring now to FIG. 4, a flowchart of a method 51 for controlling operation of headlights in a host vehicle 40 according to one non-limiting exemplary embodiment of the present disclosure is shown. As seen therein, and with continuing reference to FIGS. 1, 2A-2D, and 3, after the start 53 of the method 51, the BCM 16 of a host vehicle 12, 40 may determine whether the high beams of the headlights 14 of the host vehicle 12, 40 have been requested 54. If not, the BCM 16 may repeat such a determination. Otherwise, the BCM 16 and/or the V2X/CV2X module 18 may receive and decode 56 BSM data as previously described contained in a V2X communication. Based on such BSM data, the BCM 16 and/or the V2X/CV2X module 18 may calculate 58 the trajectories of the host vehicle 12, 40 and a second vehicle 26, 42. Based on such calculations, the BCM 16 may determine 60 whether a high beam condition between the host vehicle 12, 40 and the second vehicle 26, 42 exists, such as an approach, overtaking, road curve, or road hill condition previously described. If so, the BCM 16 may transmit 62 a message over a vehicle network to effectuate dimming of the high beams of the headlights 14 of the host vehicle 12, 40. Alternatively, if a high beam condition between the host vehicle 12, 40 and the second vehicle 26, 42 ceases to exist, the BCM 16 may transmit 64 a message over a vehicle network to effectuate a restoration of the high beams of the headlights 14 of the host vehicle 12, 40. After either such message transmission 62, 64 over a vehicle network, the method 51 again determines whether the high beams of the headlights 14 of the host vehicle 12, 40 have been requested 54.

Figure 5:
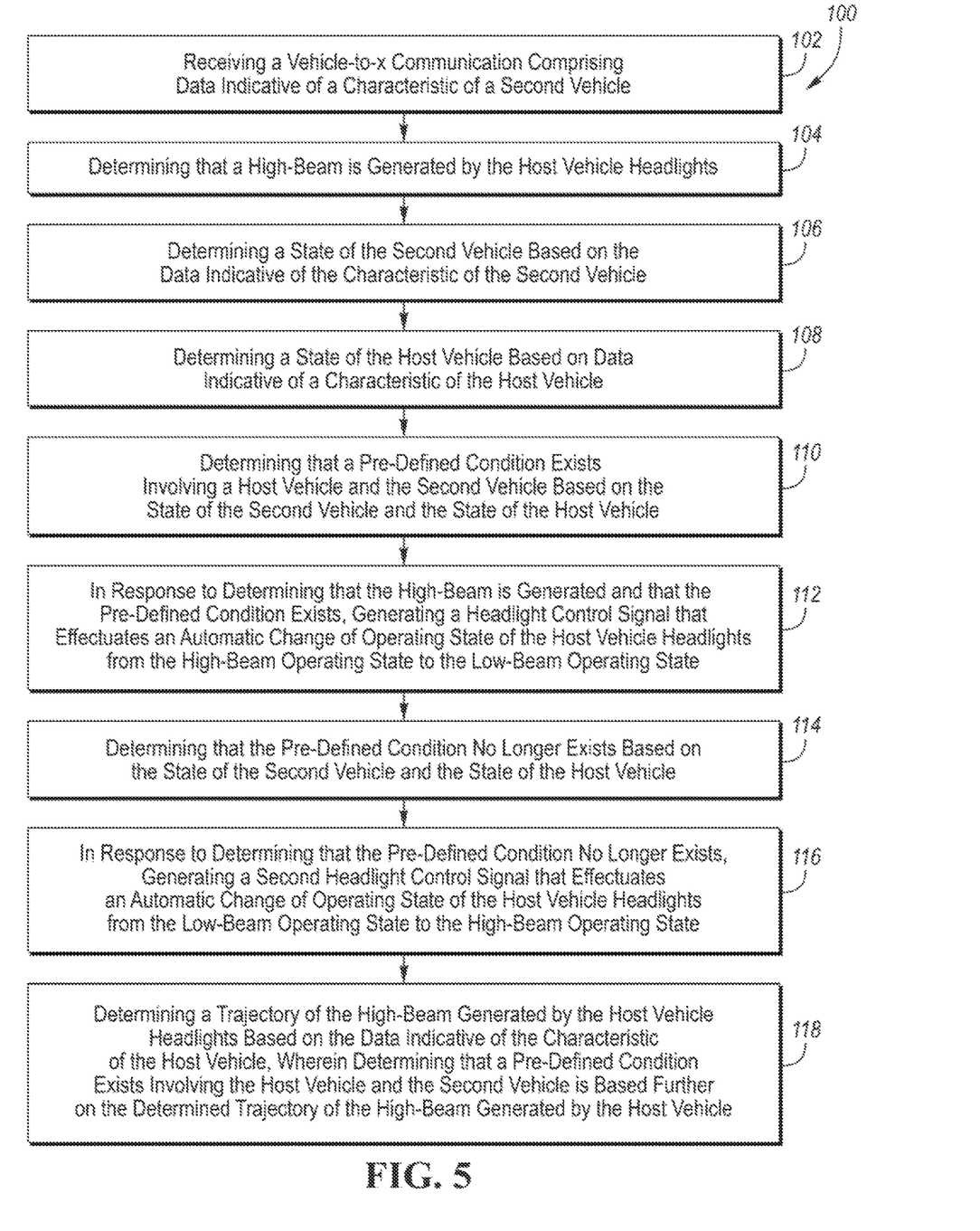
FIG. 5 is a flowchart of a method for controlling operation of headlights in a host vehicle according to one non-limiting exemplary embodiment of the present disclosure.

Referring next to FIG. 5, a flowchart of a method 100 for controlling operation of headlights in a host vehicle according to one non-limiting exemplary embodiment of the present disclosure is shown. As seen therein, and with continuing reference to FIGS. 1-4, the method 100 provides for controlling operation of headlights 14 in a host vehicle 12, 40, the host vehicle headlights 14 having a low-beam operating state and a high-beam operating state, and the host vehicle 12, 40 comprising a communication unit 18 and a controller 16, the communication unit 18 provided in communication with the controller 16. The method 100 may comprise receiving 102, by the communication unit 18, a vehicle-to-x (V2X) communication comprising data indicative of a characteristic of a second vehicle 26, 42, and determining 104, by the controller 16, that a high-beam is generated by the host vehicle headlights 14.

The method 100 may also comprise determining 106, by the controller, a state of the second vehicle 26, 42 based on the data indicative of the characteristic of the second vehicle 26, 42, and determining 108, by the controller, a state of the host vehicle 12, 40 based on data indicative of a characteristic of the host vehicle 12, 40. The method 100 may further comprise determining 110, by the controller 16, that a pre-defined condition exists involving the host vehicle 12, 40 and the second vehicle 26, 42 based on the state of the second vehicle 26, 42 and the state of the host vehicle 12, 40. The method 100 may still further comprise, in response to determining 104 that the high-beam is generated and determining 110 that the pre-defined condition exists, generating 112, by the controller 16, a headlight control signal, wherein the headlight control signal effectuates an automatic change of operating state of the host vehicle headlights 14 from the high-beam operating state to the low-beam operating state.

The state of the host vehicle 12, 40 may comprise a host vehicle trajectory offset angle (β) and the state of the second vehicle 26, 42 may comprise a second vehicle trajectory offset angle (χ). The data indicative of the characteristic of the host vehicle 12, 40 may comprise data indicative of a position, heading, elevation, speed, acceleration, yaw rate and/or path history of the host vehicle 12, 40. Similarly, the data indicative of the characteristic of the second vehicle 26, 42 may comprise data indicative of a position, heading, elevation, speed, acceleration, yaw rate and/or path history of the second vehicle 26, 42.

The pre-defined condition may comprise an approaching condition wherein the host vehicle 12, 40 is traveling in a first traffic direction (D1) and the second vehicle 26, 42 is traveling in a second traffic direction (D2) opposite the first traffic direction (D1), or an overtaking condition wherein the host vehicle 12, 40 and second vehicle 26, 42 are traveling a same traffic direction (D1). The approaching condition or the overtaking condition may further comprise a road curve 50 or a road hill 52 located between the host vehicle 12, 40 and the second vehicle 26, 42, and the headlight control signal may effectuate the automatic change of state of the host vehicle headlights 14 from the high-beam operating state to the low-beam operating state before the high-beam generated by the headlights 14 of the host vehicle 12, 40 is incident on the second vehicle 26, 42.

The method 100 may also comprise determining 114, by the controller 16, that the pre-defined condition between the host vehicle 12, 40 and the second vehicle 26, 42 no longer exists based on the state of the second vehicle 26, 42 and the state of the host vehicle 12, 40. The method may further comprise, in response to determining 114 that the pre-defined condition no longer exists, generating 116, by the controller 16, a second headlight control signal, wherein the second headlight control signal effectuates an automatic change of operating state of the host vehicle headlights 14 from the low-beam operating state to the high-beam operating state. The method 100 may still further comprise determining 118, by the controller 16, a trajectory of the high-beam generated by the host vehicle headlights 14 based on the data indicative of the characteristic of the host vehicle 12, 40, and determining 110 that the pre-defined condition exists involving the host vehicle 12, 40 and the second vehicle 26, 42 may be based further on the determined trajectory 118 of the high-beam generated by the headlights 14 of the host vehicle 12, 40.

With continuing reference to FIGS. 1-5, a system 10 and methods 51, 100 are shown for controlling operation of headlights 14 in a host vehicle 12, 40. The host vehicle headlights 14 may have a low-beam operating state and a high-beam operating state. The system 10 may comprise a communication unit 18 adapted to be mounted in the host vehicle and configured to receive a vehicle-to-x (V2X) communication comprising data indicative of a characteristic of a second vehicle 26, 42. The system may also comprise a controller 16 adapted to be mounted in the host vehicle 12, 40 and provided in communication with the communication unit 18. The controller 16 may be configured to determine that a high-beam is generated by the host vehicle headlights 14, determine a state of the second vehicle 26, 42 based on the data indicative of the characteristic of the second vehicle 26, 42, and determine a state of the host vehicle 12, 40 based on data indicative of a characteristic of the host vehicle 12, 40. The controller 16 may be further configured to determine that a pre-defined condition exists involving the host vehicle 12, 40 and the second vehicle 26, 42 based on the state of the second vehicle 26, 42 and the state of the host vehicle 12, 40, and, in response to the determination that the high-beam is generated and the determination that the pre-defined condition exists, generate a headlight control signal, wherein the headlight control signal effectuates an automatic change of operating state of the host vehicle headlights 14 from the high-beam operating state to the low-beam operating state.

In that regard, the state of the host vehicle 12, 40 may comprise a host vehicle trajectory offset angle (β) and the state of the second vehicle 26, 42 may comprise a second vehicle trajectory offset angle (χ). The data indicative of the characteristic of the host vehicle 12, 40 may comprise data indicative of a position, heading, elevation, speed, acceleration, yaw rate and/or path history of the host vehicle 12, 40. Similarly, the data indicative of the characteristic of the second vehicle 26, 42 may comprise data indicative of a position, heading, elevation, speed, acceleration, yaw rate and/or path history of the second vehicle 26, 42.

The pre-defined condition involving the host vehicle 12, 40 and the second vehicle 26, 42 may comprises an approaching condition wherein the host vehicle 12, 40 is traveling in a first traffic direction (D1) and the second vehicle 26, 42 is traveling in a second traffic direction (D2) opposite the first traffic direction (D1), or an overtaking condition wherein the host vehicle 12, 40 and the second vehicle 26, 42 are traveling a same traffic direction (D1). The approaching condition or the overtaking condition may further comprises a road curve 50 or a road hill 52 located between the host vehicle 12, 40 and the second vehicle 26, 42, and the headlight control signal may effectuate the automatic change of state of the host vehicle headlights 14 from the high-beam operating state to the low-beam operating state before the high-beam generated by the host vehicle 12, 40 is incident on the second vehicle 26, 42.

The controller 16 may also be configured to determine that the pre-defined condition between the host vehicle 12, 40 and the second vehicle 26, 42 no longer exists based on the state of the second vehicle 26, 42 and the state of the host vehicle 12, 40. The controller 16 may further be configured to, in response to the determination that the pre-defined condition no longer exists, generate a second headlight control signal, wherein the second headlight control signal effectuates an automatic change of operating state of the host vehicle headlights 14 from the low-beam operating state to the high-beam operating state. The controller 16 may still further be configured to determine a trajectory of the high-beam generated by the host vehicle headlights 14 based on the data indicative of the characteristic of the host vehicle 12, 40 and to determine that a pre-defined condition exists involving the host vehicle 12, 40 and the second vehicle 26, 42 based further on the determined trajectory of the high-beam generated by the host vehicle 12, 40.

The communication unit 18 of the system 10 may comprise a vehicle-to-x (V2X) communication unit including at least one antenna 20, 22 configured for wireless radio frequency communication. The vehicle-to-x (V2X) communication may comprise a wireless radio frequency signal, such as a DSRC WLAN or cellular signal.

The system 10 may further comprise a second controller (not shown) adapted to be mounted in the host vehicle 12, 40 and provided in communication with the controller 16. In that regard, the second controller may comprise a lighting control module, a body control module, or a vehicle system controller.

The second controller may be configured to receive the headlight control signal from the controller 16 and automatically change the operating state of the host vehicle headlights 14 from the high-beam operating state to the low-beam operating state. The second controller may also be configured to enable automatic control of the host vehicle headlights 14 in response to a determination, based on an input signal indicative of an ambient light level received by the second controller from an ambient light sensor (not shown), that the ambient light level fails to exceed a pre-defined threshold for a pre-defined time period. The second controller may also be configured to disable automatic control of the host vehicle headlights 14 in response to a determination, based on the input signal indicative of an ambient light level received by the second controller from an ambient light sensor, that the ambient light level exceeds the pre-defined threshold for the pre-defined time period. The second controller may further be configured to enable automatic control of the host vehicle headlights 14 based on an input signal representing an enable automatic headlight control command from a driver of the host vehicle 12, 40, and to disable automatic control of the host vehicle headlights 14 based on an input signal representing a disable automatic headlight control command from a driver of the host vehicle 12, 40.

Alternatively, the system 10 for controlling operation of headlights 14 in a host vehicle 12, 40, the host vehicle headlights 14 having a low-beam operating state and a high-beam operating state may comprise a communication unit 18 adapted to be mounted in the host vehicle 12, 40 and configured to receive a vehicle-to-x (V2X) communication comprising data indicative of a state of a second vehicle 26, 42, and a controller 16 adapted to be mounted in the host vehicle 12, 40 and provided in communication with the communication unit 18. In this embodiment, the controller 16 may be configured to determine that a high-beam is generated by the host vehicle headlights 14, determine a state of the second vehicle 26, 42 based on the data indicative of a characteristic of the second vehicle 26, 42, determine a state of the host vehicle 12, 40 based on data indicative of a characteristic of the host vehicle 12, 40, determine that a pre-defined condition exists involving the host vehicle 12, 40 and the second vehicle 26, 42 based on the state of the second vehicle 26, 42 and the state of the host vehicle 12, 40, and, in response to the determination that the high-beam is generated and the determination that the pre-defined condition exists, generate a headlight alert signal, wherein the headlight alert signal effectuates a warning to a driver of the host vehicle 12, 40 that the pre-defined condition exists. In that regard, the headlight alert signal may be a signal effectuating any type of visible, audible, or tactile alert, such as activating an instrument cluster lamp, sounding an audible tone, or a vibrating a seat or steering wheel.

Once again, the state of the host vehicle 12, 40 may comprise a host vehicle trajectory offset angle (β), which may be based on the data indicative of the characteristic of the host vehicle 12, 40. Similarly, the state of the second vehicle 26, 42 may comprise a second vehicle trajectory offset angle (χ), which may be based on the data indicative of the characteristic of the second vehicle 26, 42. The data indicative of the characteristic of the host vehicle 12, 40 may comprise data indicative of a position, heading, elevation, speed, acceleration, yaw rate and/or path history of the host vehicle 12, 40. Similarly, the data indicative of the characteristic of the second vehicle 26, 42 may comprise data indicative of a position, heading, elevation, speed, acceleration, yaw rate and/or path history of the second vehicle 26, 42. The pre-defined condition may comprise an approaching condition wherein the host vehicle 12, 40 is traveling in a first traffic direction (D1) and the second vehicle 26, 42 is traveling in a second traffic direction (D2) opposite the first traffic direction (D1), or an overtaking condition wherein the host vehicle 12, 40 and the second vehicle 26, 42 are traveling a same traffic direction (D1). The approaching condition or the overtaking condition may further comprise a road curve 50 or a road hill 52 located between the host vehicle 12, 40 and the second vehicle 26, 42, and the headlight alert signal may effectuates the warning to the driver of the host vehicle 12, 40 that the pre-defined condition exists before the high-beam generated by the headlights 14 of the host vehicle 12, 40 is incident on the second vehicle 26, 42.

The present disclosure thus describes a system and method for automatically controlling operation of headlights in a host vehicle using data from V2X communications, such as CV2X communications. The system and method of the present disclosure overcome problems associated with existing systems for dimming vehicle headlight high-beams, which rely on line-of-sight sensing and do not work reliably or work too late around corners, curves, or hills in a road between vehicles and which do not work in overtaking situations. The system and method of the present disclosure control headlight operation in a host vehicle independent of, without regard to, or without need for line-of-sight or field of view host vehicle systems for sensing an exterior environment around the host vehicle and thus may also advantageously replace such existing separate vehicle sensors, sensor systems, and related control electronics, thereby saving costs associated with such items.

Using data from V2X communications, such as CV2X communications, such as vehicle position, elevation, speed, heading, acceleration, yaw rate and/or path history, provided in Basic Safety Messages (BSM), the system and method of the present disclosure determine if high-beams from vehicle headlights will shine into another vehicle causing distraction or temporary blindness for the driver of the other vehicle. If such a condition involving the vehicles exists, such as approaching, overtaking, road curves, or road hills, the system and method of the present disclosure may automatically dim the vehicle headlight high-beams, as well as restore the high-beams after such a condition ceases to exists. The system and method of the present invention are able to operate correctly and achieve such results even when the vehicles are not in a line-of-sight configuration, for example around a curve or hill in the road between the vehicles. The system and method of the present disclosure also provide for greater range and accuracy in automatically controlling operation of headlights in a host vehicle than existing systems for dimming vehicle headlight high-beams.

As is readily apparent from the foregoing, various non-limiting embodiments of a system and method for controlling operation of headlights in a host vehicle have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for controlling operation of headlights in a host vehicle traveling on a road, the host vehicle headlights having a low-beam operating state and a high-beam operating state, the system comprising:
  a communication unit to be mounted in the host vehicle and configured to receive a vehicle-to-x communication comprising data indicative of a characteristic of a second vehicle traveling on the road; and
  a controller to be mounted in the host vehicle and provided in communication with the communication unit, wherein the controller is configured to
  determine that a high-beam is generated by the host vehicle headlights,
  determine a state of the second vehicle based on the data indicative of the characteristic of the second vehicle,
  determine a state of the host vehicle based on data indicative of a characteristic of the host vehicle,
  determine that a pre-defined condition exists involving the host vehicle and the second vehicle based on the state of the second vehicle and the state of the host vehicle, and
  in response to the determination that the high-beam is generated and the determination that the pre-defined condition exists, generate a headlight control signal, wherein the headlight control signal effectuates an automatic change of operating state of the host vehicle headlights from the high-beam operating state to the low-beam operating state;
  wherein the pre-defined condition comprises a temporary non-line-of-sight (NLOS) condition along the road between the host vehicle and the second vehicle wherein the high-beam generated by the host vehicle headlights is not currently incident on the second vehicle but will be incident on the second vehicle absent a change of the state of the host vehicle headlights from the high-beam operating sate to the low-beam operating state, and wherein the headlight control signal effectuates the automatic change of state of the host vehicle headlights from the high-beam operating state to the low-beam operating state before the high-beam generated by the host vehicle headlights is incident on the second vehicle.

2. The system of claim 1 wherein the state of the host vehicle comprises a host vehicle trajectory offset angle and the state of the second vehicle comprises a second vehicle trajectory offset angle.

3. The system of claim 1 wherein the data indicative of the characteristic of the host vehicle comprises data indicative of a position, heading, elevation, speed, acceleration, yaw rate and/or path history of the host vehicle, and wherein the data indicative of the characteristic of the second vehicle comprises data indicative of a position, heading, elevation, speed, acceleration, yaw rate and/or path history of the second vehicle.

4. The system of claim 1 wherein the pre-defined condition comprises an approaching condition wherein the host vehicle is traveling in a first traffic direction and the second vehicle is traveling in a second traffic direction opposite the first traffic direction, or an overtaking condition wherein the host vehicle and second vehicle are traveling in a same traffic direction.

5. The system of claim 4 wherein the approaching condition or the overtaking condition further comprises a road curve or a road hill located between the host vehicle and the second vehicle.

6. The system of claim 1 wherein the controller is further configured to:
  determine that the pre-defined condition no longer exists based on the state of the second vehicle and the state of the host vehicle; and
  in response to the determination that the pre-defined condition no longer exists, generate a second headlight control signal, wherein the second headlight control signal effectuates an automatic change of operating state of the host vehicle headlights from the low-beam operating state to the high-beam operating state.

7. The system of claim 1 wherein the controller is further configured to determine a trajectory of the high-beam generated by the host vehicle headlights based on the data indicative of the characteristic of the host vehicle and to determine that the pre-defined condition exists involving the host vehicle and the second vehicle based further on the determined trajectory of the high-beam generated by the host vehicle.

8. The system of claim 1 wherein the communication unit comprises a vehicle-to-x communication unit including at least one antenna configured for wireless radio frequency communication and the vehicle-to-x communication comprises a wireless radio frequency signal.

9. The system of claim 1 further comprising a second controller to be mounted in the host vehicle and provided in communication with the controller, wherein the second controller is configured to:
  receive the headlight control signal and automatically change the operating state of the host vehicle headlights from the high-beam operating state to the low-beam operating state;
  enable automatic control of the host vehicle headlights in response to a determination, based on an input signal indicative of an ambient light level received by the second controller from an ambient light sensor, that the ambient light level fails to exceed a pre-defined threshold for a pre-defined time period;
  disable automatic control of the host vehicle headlights in response to a determination, based on the input signal indicative of an ambient light level received by the second controller from an ambient light sensor, that the ambient light level exceeds the pre-defined threshold for the pre-defined time period;
  enable automatic control of the host vehicle headlights based on an input signal representing an enable automatic headlight control command from a driver of the host vehicle; and
  disable automatic control of the host vehicle headlights based on an input signal representing a disable automatic headlight control command from a driver of the host vehicle.

10. A method for controlling operation of headlights in a host vehicle traveling on a road, the host vehicle headlights having a low-beam operating state and a high-beam operating state, the host vehicle comprising a communication unit and a controller, the communication unit provided in communication with the controller, the method comprising:
  receiving, by the communication unit, a vehicle-to-x communication comprising data indicative of a characteristic of a second vehicle traveling on the road;
  determining, by the controller, that a high-beam is generated by the host vehicle headlights;
  determining, by the controller, a state of the second vehicle based on the data indicative of the characteristic of the second vehicle;
  determining, by the controller, a state of the host vehicle based on data indicative of a characteristic of the host vehicle;
  determining, by the controller, that a pre-defined condition exists involving the host vehicle and the second vehicle based on the state of the second vehicle and the state of the host vehicle; and
  in response to determining that the high-beam is generated and determining that the pre-defined condition exists, generating, by the controller, a headlight control signal, wherein the headlight control signal effectuates an automatic change of operating state of the host vehicle headlights from the high-beam operating state to the low-beam operating state;
  wherein the pre-defined condition comprises a temporary non-line-of-sight (NLOS) condition along the road between the host vehicle and the second vehicle wherein the high-beam generated by the host vehicle headlights is not currently incident on the second vehicle but will be incident on the second vehicle absent a change of the state of the host vehicle headlights from the high-beam operating sate to the low-beam operating state, and wherein the headlight control signal effectuates the automatic change of state of the host vehicle headlights from the high-beam operating state to the low-beam operating state before the high-beam generated by the host vehicle headlights is incident on the second vehicle.

11. The method of claim 10 wherein the state of the host vehicle comprises a host vehicle trajectory offset angle and the state of the second vehicle comprises a second vehicle trajectory offset angle.

12. The method of claim 11 further comprising:
  determining, by the controller, that the pre-defined condition no longer exists based on the state of the second vehicle and the state of the host vehicle; and
  in response to determining that the pre-defined condition no longer exists, generating, by the controller, a second headlight control signal, wherein the second headlight control signal effectuates an automatic change of operating state of the host vehicle headlights from the low-beam operating state to the high-beam operating state.

13. The method of claim 11 further comprising determining, by the controller, a trajectory of the high-beam generated by the host vehicle headlights based on the data indicative of the characteristic of the host vehicle, and wherein determining that the pre-defined condition exists involving the host vehicle and the second vehicle is based further on the determined trajectory of the high-beam generated by the host vehicle.

14. The method of claim 10 wherein the data indicative of the characteristic of the host vehicle comprises data indicative of a position, heading, elevation, speed, acceleration, yaw rate and/or path history of the host vehicle, and wherein the data indicative of the characteristic of the second vehicle comprises data indicative of a position, heading, elevation, speed, acceleration, yaw rate and/or path history of the second vehicle.

15. The method of claim 10 wherein the pre-defined condition comprises an approaching condition wherein the host vehicle is traveling in a first traffic direction and the second vehicle is traveling in a second traffic direction opposite the first traffic direction, or an overtaking condition wherein the host vehicle and second vehicle are traveling in a same traffic direction.

16. The method of claim 15 wherein the approaching condition or the overtaking condition further comprises a road curve or a road hill located between the host vehicle and the second vehicle.

17. A system for controlling operation of headlights in a host vehicle traveling on a road, the host vehicle headlights having a low-beam operating state and a high-beam operating state, the system comprising:
 a communication unit to be mounted in the host vehicle and configured to receive a vehicle-to-x communication comprising data indicative of a characteristic of a second vehicle traveling on the road; and
 a controller to be mounted in the host vehicle and provided in communication with the communication unit, wherein the controller is configured to
 determine that a high-beam is generated by the host vehicle headlights,
 determine a state of the second vehicle based on the data indicative of a characteristic of the second vehicle,
 determine a state of the host vehicle based on data indicative of a characteristic of the host vehicle,
 determine that a pre-defined condition exists involving the host vehicle and the second vehicle based on the state of the second vehicle and the state of the host vehicle, and
 in response to the determination that the high-beam is generated and the determination that the pre-defined condition exists, generate a headlight alert signal, wherein the headlight alert signal effectuates a warning to a driver of the host vehicle that the pre-defined condition exists;
 wherein the pre-defined condition comprises a temporary non-line-of-sight (NLOS) condition along the road between the host vehicle and the second vehicle wherein the high-beam generated by the host vehicle headlights is not currently incident on the second vehicle but will be incident on the second vehicle absent a change of the state of the host vehicle headlights from the high-beam operating sate to the low-beam operating state, and wherein the headlight alert signal effectuates the warning to the driver of the host vehicle that the pre-defined condition exists before the high-beam generated by the host vehicle is incident on the second vehicle.

18. The system of claim 17 wherein the state of the host vehicle comprises a host vehicle trajectory offset angle based on the data indicative of the characteristic of the host vehicle comprising position, heading, elevation, speed, acceleration, yaw rate and/or path history data of the host vehicle, and wherein the state of the second vehicle comprises a second vehicle trajectory offset angle based on the data indicative of the characteristic of the second vehicle comprising position, heading, elevation, speed, acceleration, yaw rate and/or path history data of the second vehicle.

19. The system of claim 17 wherein the pre-defined condition comprises an approaching condition wherein the host vehicle is traveling in a first traffic direction and the second vehicle is traveling in a second traffic direction opposite the first traffic direction, or an overtaking condition wherein the host vehicle and second vehicle are traveling in a same traffic direction.

20. The system of claim 19 wherein the approaching condition or the overtaking condition further comprises a road curve or a road hill located between the host vehicle and the second vehicle.

* * * * *

UNITED STATES PATENT AND TRADEMARK OFFICE
CERTIFICATE OF CORRECTION

PATENT NO. : 11,198,386 B2  
APPLICATION NO. : 16/504913  
DATED : December 14, 2021  
INVENTOR(S) : David R. Mulligan et al.

Page 1 of 1

It is certified that error appears in the above-identified patent and that said Letters Patent is hereby corrected as shown below:

In the Claims

Column 16, Line 64, Claim 1:  
After "from the high-beam operating"  
Delete "sate" and  
Insert -- state --.

Column 18, Line 49, Claim 10:  
After "from the high-beam operating"  
Delete "sate" and  
Insert -- state --.

Column 20, Line 19, Claim 17:  
After "from the high-beam operating"  
Delete "sate" and  
Insert -- state --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*